Patented July 11, 1933

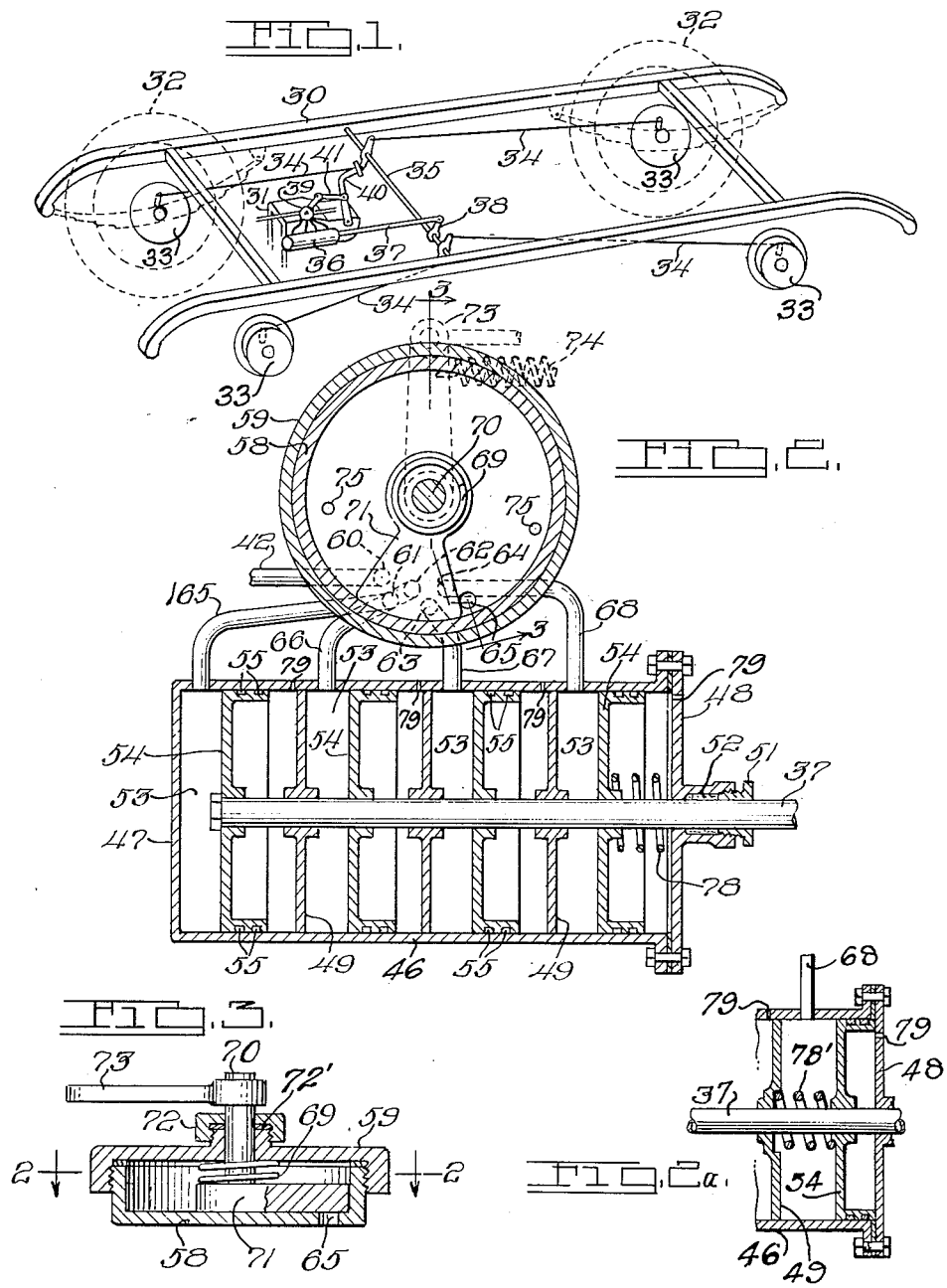

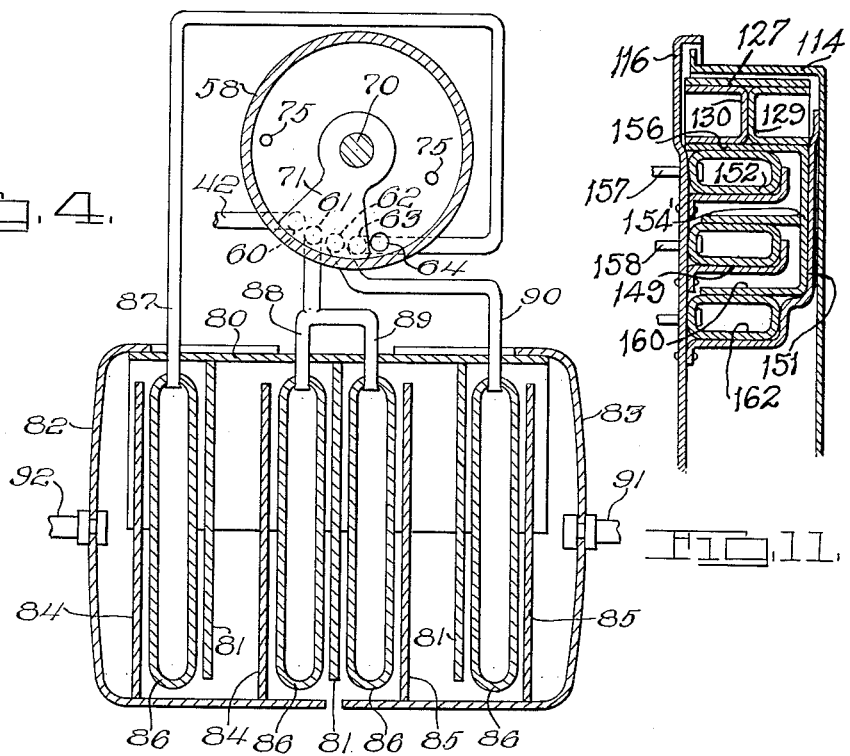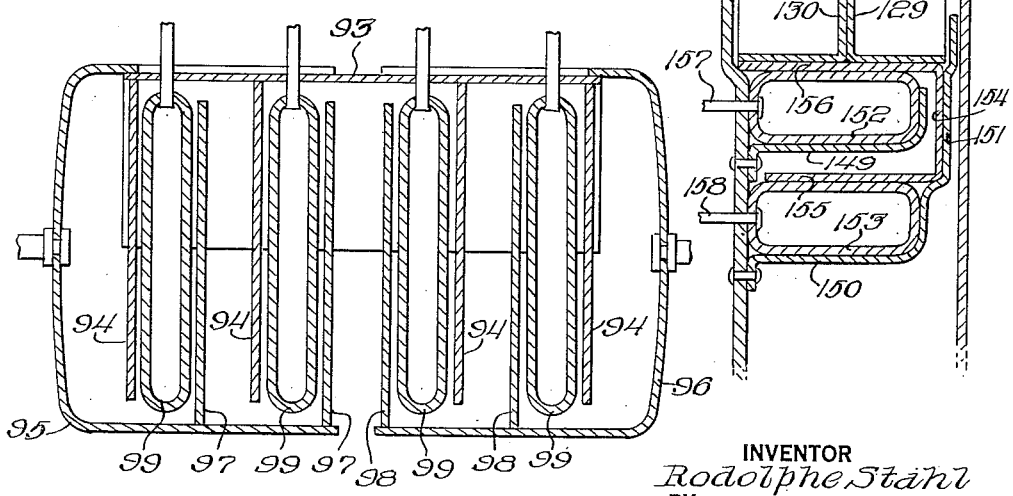

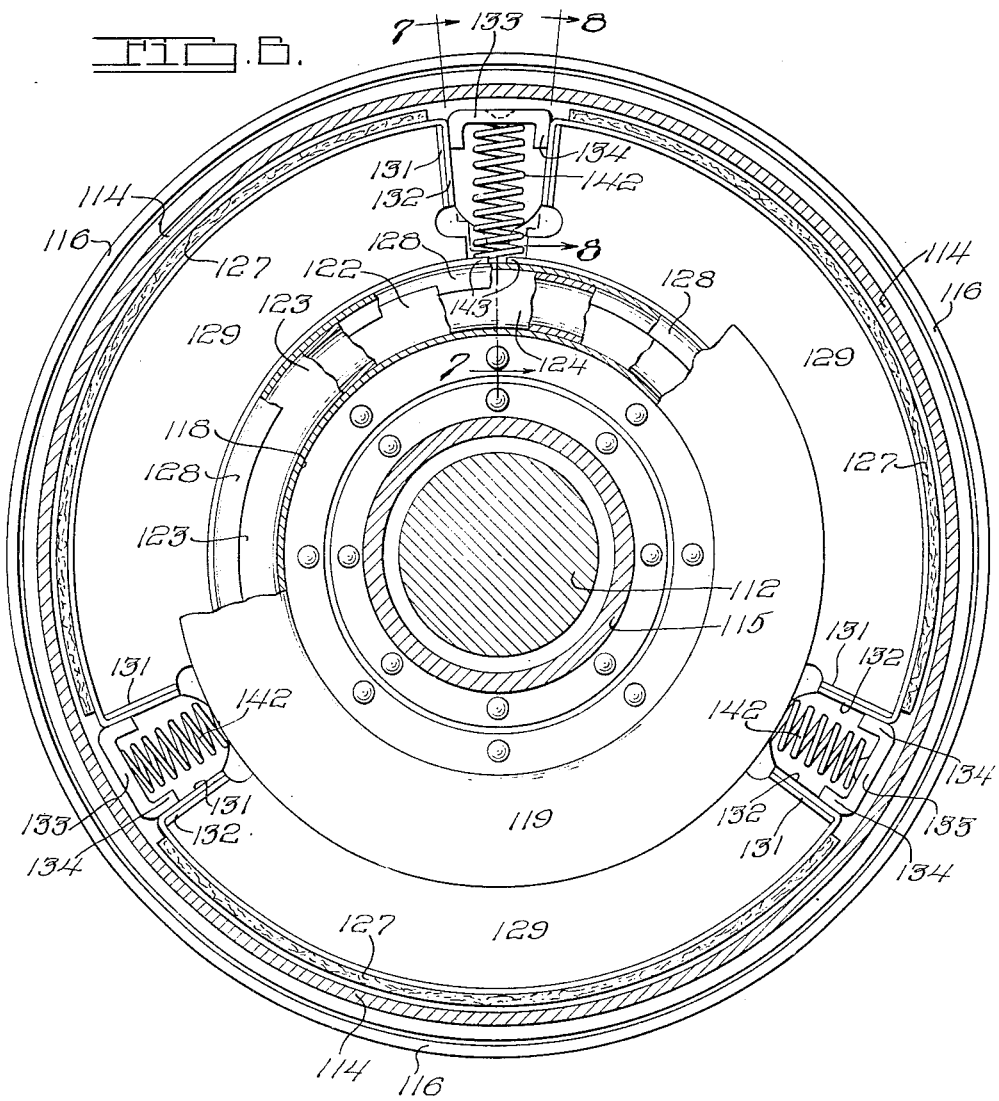

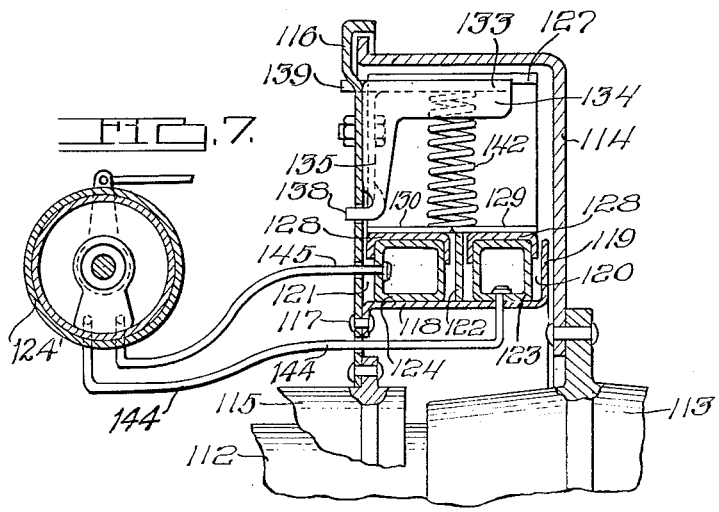
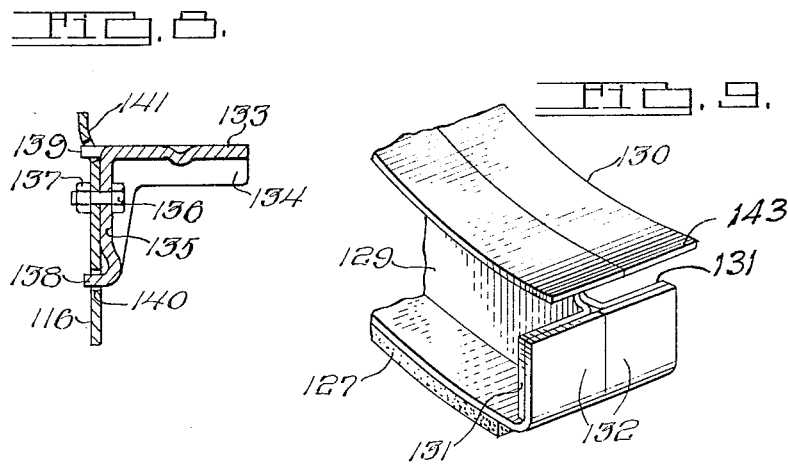

1,917,671

UNITED STATES PATENT OFFICE

RODOLPHE STAHL, OF DETROIT, MICHIGAN

BRAKE

Application filed April 20, 1929. Serial No. 356,813.

This invention relates to fluid pressure mechanism, and particularly to a power unit adapted to be operated by a fluid pressure whereby to enable it to perform useful work, the principal object being the provision of a construction by which the force exerted by the unit may be readily and accurately controlled.

Another object is to provide a fluid pressure actuated mechanism including a plurality of cooperating pressure actuated members, together with means for controlling the application of fluid pressure to such members.

Another object is to provide a pressure actuated power member including a plurality of cooperating members adapted to be acted upon by fluid under pressure supplied from a common source, together with means permitting progressive application of the fluid pressure to the members whereby to control the force exerted by the member.

A further object is to provide a fluid pressure actuated mechanism including certain arrangement of parts and details of design to be hereinafter described, or which will be obvious, in the following specification.

The above being among the objects of the present invention, the same consists in certain novel features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views;

Fig. 1 is a more-or-less diagrammatic fragmentary perspective view of a motor vehicle chassis, including a braking system actuated by a fluid pressure means, in accordance with the present invention.

Fig. 2 is a more-or-less diagrammatic vertical sectional view taken axially through the fluid pressure operating member shown in Fig. 1, and further showing the control valve therefor in section taken as on the line 2—2 of Fig. 3.

Fig. 2a is a fragmentary sectional view showing a slight modification of the construction illustrated in Fig. 2.

Fig. 3 is a sectional view of the control valve shown in Fig. 2 and taken as on the line 3—3 of that figure.

Fig. 4 is a view similar to Fig. 2 but showing a modified form of construction.

Fig. 5 is a vertical sectional view of a modified form of power element.

Fig. 6 is a partially broken vertical sectional view through a vehicle wheel brake mechanism showing the application of the present invention thereto.

Fig. 7 is a sectional view taken on the line 8—8 of Fig. 6.

Fig. 8 is a sectional view taken as on the line 8—8 of Fig. 6 showing the manner of securing one of the bracket members to the supporting plate.

Fig. 9 is a fragmentary perspective view showing the construction of the ends of the brake shoes employed in the brake construction shown in Figs. 6 and 7.

Fig. 10 is a view similar to Fig. 7 showing a modification thereof.

Fig. 11 is a view similar to Fig. 10, showing a further development of the invention.

Although the present invention is applicable to a wide range of uses, and is therefore not limited to any specific use, the following description will be primarily limited to its application to the brake mechanism of motor vehicles, its application for other use being apparent therefrom, and within the scope of the present invention.

Where fluid pressure actuating means are employed for applying the brakes of motor vehicles, whether the construction used is that of the positive pressure or the vacuum type, there is but one source of power such as an air tank, or a suction means, which is usually maintained at a substantially predetermined constant value in connection with an air tank, and the maximum value of which in the suction type depends upon the suction available in the intake manifold of the engine which drives the vehicle. Heretofore, as far as I am aware, in order to obtain different degrees of braking effort upon the vehicle, repeated closing or opening of the valve between the source of pressure or suction and the power member, or the introduction of a readily controllable pressure reducing valve in such line, is resorted to to transmit a part or all of the pressure or suction from the source of power to the power member. The repeated opening and closing of such valve is not satisfactory for the reason that great skill acquired by long use is necessary in order to enable an operator to use the brakes safely and efficiently. The use of the reducing valve, while theoretically correct, has never been entirely successful in practice, or at least has never resulted in the desirable and safe braking action that it is desirable to have.

The present invention deals with means whereby a variable braking effort may be applied to such, or other, mechanism, and in which the pressure exerted will be definitely and accurately controlled. The method I employ to obtain this result is, in effect, to provide a plurality of power actuating means for moving the part desired, and controlling the application of pressure or suction to such means whereby the full pressure or suction from the source of supply may be applied to such means progressively, or in any other order desired, thereby eliminating the necessity of a reducing valve in the supply line or the repeated opening and closing of the valve in such supply line. I preferably so arrange this plurality of power actuated means as to form a single unit, this for the purpose of economy in cost and in space.

Referring to the drawings, I illustrate in Fig. 1, in a more-or-less diagrammatic manner, the manner in which the present invention may be employed in connection with a motor vehicle in order to operate the brakes thereof. The frame of the motor vehicle is indicated as at 30 and a power plant (not shown) having a transmission housing 31 is mounted as in the conventional constructions. The wheels 32 are each provided with a suitable brake mechanism indicated generally as at 33 and the brake mechanism 33 on each wheel is connected by suitable linkages such as 34 to a brake cross shaft 35 which is adapted to be rotated when it is desired to apply the brakes. Upon the side of the transmission housing 31, or any other suitable place, I mount my power element, generally indicated as 36 in Fig. 1, and whose shaft or operating rod 37 is connected by means of a lever 38 to the brake cross shaft 35 so that upon actuation of the power element 36 the shaft 37 is moved to rotate the shaft 35 and to cause consequent application of the brakes. A valve mechanism indicated generally as at 39 in Fig. 1 controls the application of suction or pressure to the power element 36, it being controlled by the movement of the usual foot pedal 40 to which it is connected by means of a link such as 41. A tube or pipe 42 leading to the source of power, whether it be fluid under pressure, or a source of suction is connected with the valve 39.

The power element, indicated generally as 36 in Fig. 1, may take the form indicated in Fig. 2 in which it is shown as comprising a cylinder 46 closed by the integral wall 47 at one end and by the removal wall 48 at the opposite end. The interior of the cylinder 46 is provided with a plurality of spaced dividing walls 49 therein which act to form the interior of the cylinder into a plurality of separate compartments 53. A piston rod or shaft 37 positioned axially of the cylinder 46 is slidably received in each of the walls 49 and in the wall 48, the wall 48 being provided with a suitable gland 51 and packing 52 in order to prevent passage of air between the piston rod 37 and the wall 48. No packing is ordinarily necessary between the various walls 49 and rod 37 where the fit between the same is maintained in relatively close limits. Rigidly secured to the rod 37 within each of the compartments 53 is a piston 54 which may or may not be provided with suitable packing, such as the rings 55, as is found desirable.

The valve indicated generally as 39 in Fig. 1 which controls the admission of the suction or pressure to the various chambers 53 in order to cause actuation of the pistons 54 and rod 37, is shown in detail in Figs. 2 and 3 as comprising a cup shaped casing 58 provided with a cap 59 secured against leakage thereto. The bottom wall of the cup is provided with a plurality of openings therethrough indicated as 60, 61, 62, 63, 64 and 65. The opening 60 is connected to the supply pipe 42. The opening 61 is connected by a tube or pipe 165 with one of the compartments 53; the opening 62 by the tube or pipe 66 with another compartment 53; and the openings 63 and 64 by tubes 67 and 68 to still other compartments 53. In other words, each of the compartments 53 is connected with the interior of the cup 58 by a separate tube. The opening 65, which constitutes the exhaust opening for the mechanism, discharges directly into the surrounding air from the cup. Within the cup and pressed against the bottom thereof by means of a coil spring such as 69, is a valve member 71 formed to the shape of a segment of a circle and having a relatively non-rotatable shaft 70 projecting upwardly through the cap 59 where it is sealed against leakage by means of a nut 72 and suitable packing 72'. An arm 73 is secured to the shaft 71 on the outside of the valve, and this arm may be connected by a link such as 41 to the pedal 40 in the construction shown in Fig. 1. The valve member 70 when the power element or the brakes in Fig. 1 are in inoperative position, may be positioned as indicated in Fig.

2 so as to overlie the openings 60 to 64 inclusive, but not the opening 65.

In the position of the valve member, as indicated in Fig. 2, it will be apparent that the flow of fluid under pressure, either positive or negative, relative to the supply pipe 42 is cut off from the interior of the cup 58 by the valve member 71 which overlies the opening 60. It will also be apparent that as long as the valve member 71 overlies the opening 60 no pressure will be transmitted to the interior of the cup, and that if the valve member 71 is rotated in a clock-wise direction so that all of the openings except the opening 60 is covered by the valve member 71, any pressure or suction within all of the compartments 53 or within the cup 58 will be released through the openings 65. It will also be apparent that if the valve member 71 is rotated in a counter-clockwise direction from the position shown in Fig. 2, the valve member 71 will first move to close the opening 65 and then move to uncover the opening 60, thereby transmitting the pressure in the pipe 42 to the interior of the cup 58. Upon further counter-clockwise rotation of the member 71 the openings 61 to 64 will be progressively uncovered.

From this it will be obvious that if the valve member 71 is rotated in a counter-clockwise direction, as viewed in Fig. 2, the pressure in the supply pipe 42 will be progressively transmitted to the various compartments 53, and upon each compartment 53 being subjected to such pressure, such pressure acting upon the face of the corresponding piston 54 will exert a predetermined force tending to move the rod 37. If the valve member 71 is moved only far enough to uncover the opening 61 only a definite amount of force will be applied to the rod 37. If the valve member 71 is moved to uncover both openings 61 and 62 a double amount of pressure will be applied to the rod 37, and the pressure tending to move the rod 37 will thus increase as each opening 61 to 64 inclusive is uncovered to the pressure of the fluid in the supply pipe 42. In this manner, and by employing a sufficient number of compartments 53, a gradually increasing force on the rod 37 may be obtained, and this without attempting to vary in any manner whatsoever the degree of pressure in the pressure supplying device.

Theoretically, of course, it would be desirable to have a sufficiently great number of compartments 53 so that the increasing pressure on the rod 37 from closed position to full open position of the valve would be by imperceptible steps, but for practical reasons the number of steps or stages may be materially reduced, as indicated in the drawings, so that the benefits of such construction may be realized without any undue complication of parts.

In this construction, it will be apparent that the power element is equally effective where the power actuating medium is either a positive pressure, or a suction, the only difference in such cases being a reversal of the direction of movement of the rod 37. Where the power actuating medium is of the positive pressure type, it is, of course, preferable to provide some means for returning the piston 54 and rod 39 to their inoperative positions upon release of the pressure, and in such cases a coil spring such as 78 surrounding the rod 37 between the wall 48 and the adjacent piston 54 and held under compression therebetween may be provided. Where the pressure actuating medium is of the suction type the spring 78 will, of course, be positioned on the opposite sides of the piston 54, as indicated in Fig. 2a at 78'. In both cases vent openings such as 79 are preferably provided for each compartment 53 to relieve the suction or pressure behind each piston 54. A spring such as 74 may be employed for returning the valve to inoperative position. The rod 37, however, will be moved in an opposite direction by suction with respect to its movement by pressure. This reversal in the movement of the rod is conveniently compensated for by extending the lever 38, in Fig. 2, downwardly in place of upwardly.

The air trapped in a chamber 53, when such chamber is not connected with a source of suction or pressure, while another chamber is so connected, will be under atmospheric pressure and at no time will its pressure become excessive unless the pistons are moved substantially the full stroke. The main effect of this entrapped air will be to modify the power exerted by the pistons then being subjected to the source of pressure and will thus tend to cause a more gradual application of the braking means.

It is of course apparent that a wide variety of power elements constructed in various manners may be employed in place of the specific construction of the power element shown in Fig. 2, and that the rod actuated thereby may be caused to operate in either direction. One modification is shown in Fig. 4, and as shown comprises a relatively stationary member 80 provided with a plurality of spaced rigid walls 81. Slidably encircling each end of the member 80 and walls 81 are a pair of members 82 and 83, the member 82 being provided with a plurality of walls 84 rigidly secured thereto in parallel relationship with corresponding walls 81 of the member 80, and the member 83 being provided with a plurality of rigid spaced walls 85 positioned in spaced relationship with corresponding walls 81 of the member 80. Between adjacent walls 81 and 84 and between adjacent walls 81 and 85 one or more expansible and contractable hollow members 86 are positioned. The members 86 may take the form of bags formed of rubberized fabric, as shown, or may be of any other suitable type of expansible members. In any case, each of them is connected by tubes such as 87 to 90 inclusive with a valve mechanism of the same type and construction as shown in Figs. 2 and 3, but in the present case, the opening 61 is shown as being connected to two of the members 86 and preferably those two on either side of the central walls 81, so that when the valve member 71 in this case is moved to uncover both openings 60 and 61 the pressure from the supply pipe 42 will be simultaneously introduced to two of the members 86. The remaining members 86 may be connected up as shown so that they are progressively subjected to the pressure from the supply pipe 42 upon further movement of the valve member 71 or, as it will be quite apparent, they may be connected in any other suitable manner if desired. The members 82 and 83 are, of course, preferably provided with rods such as 91 and 92 for transmitting the force of expansion of the members 86 to suitable mechanism to be operated thereby.

The construction shown in Fig. 4 produces an expansion or elongation of the power element when fluid under pressure is introduced into the members 86. Where it is desired to obtain a contraction instead of an expansion, the construction shown in Fig. 4 may be varied as indicated in Fig. 5 in which a supporting member 93 having walls 94 of the same general type as the member 80 and walls 81 in Fig. 2, are employed, as are also end members 95 and 96 having walls 97 and 98 respectively, corresponding to the members 82 and 83 and walls 84 and 85 respectively. In this case however, the walls 94 are positioned upon the opposite sides of the walls 97 from the corresponding walls shown in Fig. 4, so that the expansible elements 99 in expanding, cause a contraction or shortening of the length of the device rather than an expansion of the same. The various elements 99 may, of course, be connected to a suitable source of pressure through any suitable control valve mechanism such as that already described.

It will also be apparent that it is not necessary to limit the application of the present invention to the power element such as described in Figs. 2 to 5 inclusive which acts indirectly upon the mechanism to be operated, but it may be modified so as to act directly. An example of this direct acting feature is indicated in Figs. 6 to 9 inclusive which shows the invention as applied directly to the wheel brake of a motor vehicle so that in such case each wheel brake mechanism is provided with an independent power operating means to move that brake mechanism into inoperative position. As indicated in Figs. 6 and 7, 112 represents an axle shaft having a hub 113 secured to the end thereof, which in turn carries the usual brake drum 114. The axle housing 115 has secured thereto the usual dust cover 116 which serves as a cover for the open end of the drum 114 and as a supporting and torque transmitting means for the various brake elements carried thereby. The plate 116 has secured thereto by rivets such as 117 and in concentric relationship with respect to the drum 114, an annular member 118 which is provided with a radially outwardly extending flange 119 lying in adjacent relationship with respect to the end wall of the drum 114. The space between the flange 119 and the plate 116 is divided into two substantially equal compartments 120 and 121 by the radial wall 122 which is secured at its inner edge to the annular member 118. Within the compartment 120 is positioned an expansible and contractable hollow annular member or ring 123, and a similar ring 124 is positioned in the compartment 121. The rings 123 and 124 are of substantially the same radial thickness as the depth of the flange 119 and wall 122. Positioned over each of the ring members 123 and 124 is an expansible and contractable metallic ring member 128 formed of metal or some other rigid material, and which serve to transmit the expansive force of the rings 123 and 124 to the brake shoes, as will hereinafter be described. The side edges of the members 128 are preferably turned downwardly so as to embrace the sides of the rings 123 and 124 and slidably engage the corresponding surfaces of the flange 119, wall 122 and plate 116. These members 128 act as wear plates and also act to prevent possibility of the rings 123 and 124 from becoming pinched at various points.

Positioned between the members 128 and the inner cylindrical surface of the brake drum 114 are a plurality of brake shoes, shown in the drawings as three in number. These shoes, best indicated in Fig. 9, are formed of a pair of generally circular channel sectioned members 129 and 130 respectively, secured together in back-to-back and matching relationship with the corresponding flanged portions thereof extending in opposite directions. These channels may be secured together by riveting, welding, or any other suitable means.

It will be apparent that the outer and the inner faces of each shoe is thus formed as a part of a cylindrical surface having a common center substantially coincident with that of the axis of the brake drum. Each brake shoe is, of course, preferably provided with a friction facing such as 127. The ends of the brake shoes are preferably formed to provide a flat radially extending face at each end, and although these faces may be formed in various manners, one method is shown in Fig. 9 as being preferable. As indicated in Fig. 9, a portion 131 of the web of each channel 129 and 130 is bent outwardly into parallel relationship and in a plane extending radially with respect to the axis of curvature of the inner and outer faces of the brake shoe. A portion of the outer web of each half 129 and 130 at such end is then bent inwardly as at 132 so as to lie in overlapping and matching relationship with respect to the portions 131 to which they are suitably secured by riveting, welding, or other suitable means.

Between the adjacent ends of each adjacent pair of brake shoes a bracket member 133 is secured to the backing plate 116. This bracket member 133 may be formed as indicated, from sheet metal, so as to provide a pair of inwardly turned side flanges 134 which are adapted to engage the end faces of the cooperating brake shoes, and are provided with an inwardly bent portion 135 adapted to lie in contact with the backing plate 116 and to be secured thereto by bolts such as 136 and nuts 137. They may be further secured against movement by forming tongues such as 138 and 139 thereon which are adapted to be received in openings such as 140 and 141 formed in the plate 116 for reception of the same, as is clearly indicated in Fig. 8. The brackets 133 are of such a width as to substantially occupy all of the space between the adjacent ends of the adjacent brake shoes when the brake is in its normal inoperative position. A coil spring such as 142 held under compression between each bracket 133 and the inwardly extending ends 143 of each adjacent pair of brake shoes serves to constantly urge the brake shoes out of contact with the brake drum. The brake shoes are otherwise free to move radially between the cooperating brackets 133.

The ring 123 is connected by a tube such as 144, and the ring 124 by a tube such as 145, to a pressure supply control valve which may take the form of the valve previously described as illustrated at 124' in Fig. 7. In operation then, it is possible to admit air under pressure to either the ring 123 or the ring 124, and then to both of them simultaneously. In any case, when air under pressure is admitted to either of the rings 123 or 124, or to both of them, the ring to which air is admitted will expand, and inasmuch as it is confined against expansion except in a radially outward direction, the force of expansion will be transmitted to the inner faces of the brake shoes and will thus move the brake shoes radially outwardly into contact with the drum and thereby effect a braking action upon the drum. In accordance with the present invention, if air is admitted to only one of the rings 123 or 124, only a predetermined amount of braking action is obtainable, while if air is admitted to both of the rings, a proportionate greater amount of braking effort is obtained. It is, of course, apparent that any number of such rings may be provided in order to obtain any desired maximum braking effect, or to make it possible to increase the braking effect progressively by as small steps as may be required.

The construction of the brake mechanism as indicated in Figs. 6 to 9 inclusive may be varied as indicated in Fig. 10. In this case the backing plate 116 is provided with an annular member 149 corresponding to the annular member 118 in the previous figures. It is further provided inwardly thereof with a second annular member 150 positioned in concentric and spaced relation with respect thereto. The member 150 is provided with a radially extending flange portion 151 which extends along the end of the drum to a point preferably adjacent the center of the brake shoes. The annular member 149 carries a hollow expansible ring 152 and the annular member 150 carries a hollow expansible ring 153. A shiftable channel member 154 of annular formation is positioned with one flange 155 thereof overlying the ring 153 and the other flange 156 thereof overlying the ring 152. The flange 156 bears directly on the inner faces of the brake shoes. The ring 152 is connected by a tube such as 157, and the ring 153 by a tube such as 158, to a valve mechanism which may take the form of that previously described for the purpose of controlling the introduction of air under pressure to the rings 152 and 153.

The result of this construction is substantially the same as that described in connection with the construction shown in Figs. 6 to 9 inclusive, with the exception that in this case it is possible to obtain a substantially greater pressure from the rings for a brake mechanism of substantially equal dimensions. The action is, of course, substantially the same inasmuch as the expansion of either of the rings 153 or 152 acting through the shiftable channel member 154 will move the brake shoes into contact with the brake drum, and air may be admitted to either one or both of the rings to obtain the desired amount of braking effect. Similarly, any number of such concentrically arranged rings may be provided, in the manner illustrated in Fig. 11, as is necessary or desirable.

The structure illustrated in Fig. 11, is mainly identical to that shown in Fig. 10 and corresponding parts are similarly numbered. The shiftable channel 154', however, has an additional flange 160 and the backing plate 116 is provided with an additional annular member 161 between which is disposed an expansible ring 162. It is understood that any number of such expansible rings may be added by the addition of the required number of annular members to the backing plate and flanges to the shiftable channel.

From the above it will be apparent that the present invention is subject to many modifications and variations, and formal changes may be made in the specific embodiment of the invention described without departing from the spirit or substance of the broad invention, the scope of which is commensurate with the appended claims.

What I claim is:

1. In combination, brake mechanism including a drum and a friction brake element, a plurality of expansible members, a wall disposed on each side of said members, said walls being relatively movable, means for rigidly connecting the walls on corresponding sides of said members together and with said friction brake element, and means for introducing fluid under pressure into each of said members one after the other so as to progressively build up the force with which said friction brake element is applied to said drum.

2. In combination, brake mechanism including a drum and friction brake element a plurality of expansible members, cooperating stationary walls disposed on one side of said members, cooperating movable walls disposed on the opposite side of said members, means for rigidly connecting the movable walls together and to said brake element and means for introducing fluid under pressure to said members, one after the other so as to progressively build up the force with which said brake element is applied to said drum.

3. In a brake mechanism, in combination, a brake drum, backing means, a brake element cooperatively associated with said drum, and a plurality of expansible elements interposed between said backing means and said brake element, each having corresponding faces bearing upon said backing means and said brake element at the same radial cross-section of said drum.

4. In a brake mechanism, in combination, a brake drum, backing means, a brake element cooperatively associated with said drum, a plurality of expansible elements, interposed between said backing means and said element, and means for progressively expanding said expansible elements each having corresponding faces bearing upon said backing means and said brake element at the same radial cross-section of said drum.

5. In a brake mechanism, a brake drum, a brake element engageable with said drum, a plurality of concentric arcuate expansible members, arranged in overlapping relation and each independently cooperatively associated with said element, and means for progressively expanding said expansible members.

6. In a brake mechanism, in combination, a brake drum, an arcuate brake element engageable therewith, a plurality of pressure actuated expansible members, each cooperatively associated with said element and each having one face bearing thereon at the same radial cross-section of said drum for moving said element into contact with said drum, a single pressure supply means, and means for connecting said supply means with said members one after the other.

7. In a brake mechanism, in combination, a brake drum, an arcuate brake element engageable therewith, a supporting member, means fixed with relation to said supporting member, a plurality of expansible members, each having one face bearing upn said brake element and another face bearing upon said supporting means at the same radial cross section of said drum, and means for progressively expanding said expansible members.

8. In a brake mechanism, in combination, a brake drum, a brake element engageable therewith, a supporting member, means fixed with relation to said supporting member, a plurality of expansible members interposed between said means and said element, and means for progressively expanding said expansible members, two of said expansible members being of different sizes.

9. In a brake mechanism, in combination, a brake drum, a brake element engageable therewith, a supporting member, supporting means fixed relative to said supporting member and in concentric relation with respect to said drum, a plurality of pressure actuated expansible members carried by said supporting means and each having a face cooperating with said element at the same radial cross-section of said drum to move it into engagement with said drum when one or more of them are expanded, and means for progressively expanding said expansible members.

10. In a brake mechanism, in combination, a brake drum, a brake element within said drum engageable therewith, a relatively stationary supporting member, a ring secured to said supporting member within and in concentric relationship with respect to said drum, a pair of expansible ring members interposed between the first mentioned ring and said element, and means for first expanding one of said expansible members and then expanding the other thereof.

11. In a brake mechanism, in combination, a brake drum, a brake element within said drum engageable therewith, a supporting member, a pair of radially spaced ring members carried by said supporting member within and concentric with said drum, a U-sectioned ring member positioned to receive the outer of the first mentioned ring members within it and bearing against said element, an expansible ring member positioned between each of the first mentioned ring members and that portion of said U-shaped ring member positioned radially outwardly therefrom, and means for expanding said expansible ring members.

12. In a brake mechanism, a brake drum, a brake element, engageable with said drum, a plurality of expansible members each cooperatively associated with substantially the entirety of said element, and means for progressively expanding said expansible members.

13. In a brake mechanism, in combination, a brake drum, a brake element engageable therewith, a supporting member, supporting means fixed relative to said supporting member and concentric relation with respect to said drum, a plurality of pressure actuated expansible members carried by said supporting means and each cooperating with substantially the entirety of said brake element to move it into engagement with said drum when one or more of them are expanded, and means for progressively expanding said expansible members.

14. In a brake mechanism, a brake drum, backing means, a brake element cooperatively associated therewith, and a plurality of fluid pressure actuated members interposed between said backing means and said brake element each having corresponding faces bearing upon said backing means and brake element at the same radial cross section of said drum for moving said brake element into engagement with said drum.

15. In a brake mechanism, a brake drum, backing means, a brake element cooperatively associated therewith and a plurality of progressively actuable fluid pressure actuated members, each having corresponding faces bearing upon said brake element and backing means respectively at the same radial cross section of said drum for moving said brake element into engagement with said drum.

16. In combination, a force applying member, a movable structure, a plurality of expansive members, rigid elements fixed to and movable with said structure, each engageable by one of said expansive members, a single pressure supply means, means for connecting at will one or more of said expansible members with said pressure supply means, and means connecting said movable structure to said force applying member for progressively building up the force applied thereby as said expansible members are successively connected with said pressure supply means.

17. In a brake mechanism, a brake drum having a peripheral flange, a supporting member having a peripheral flange within the flange of said drum, a brake element between said flanges, and a pair of arcuate shaped expansible members arranged in circumferentially overlapping and radially spaced relation between the flange of said supporting member and said brake element for moving the latter into engagement with said drum.

RODOLPHE STAHL.